US 8,520,895 B2

(12) United States Patent
Au et al.

(10) Patent No.: US 8,520,895 B2
(45) Date of Patent: Aug. 27, 2013

(54) SYSTEM AND METHOD FOR RANGE AND VELOCITY ESTIMATION IN VIDEO DATA AS A FUNCTION OF ANTHROPOMETRIC MEASURES

(75) Inventors: Kwong Wing Au, Bloomington, MN (US); Saad J. Bedros, West St. Paul, MN (US)

(73) Assignee: Honeywell International Inc., Morristown, NJ (US)

( * ) Notice: Subject to any disclaimer, the term of this patent is extended or adjusted under 35 U.S.C. 154(b) by 387 days.

(21) Appl. No.: 12/980,898

(22) Filed: Dec. 29, 2010

(65) Prior Publication Data
US 2012/0170815 A1 Jul. 5, 2012

(51) Int. Cl.
*G06K 9/00* (2006.01)

(52) U.S. Cl.
USPC ............. 382/103; 382/106; 382/107; 348/61; 348/135; 348/158; 42/84; 42/90; 42/111; 42/119; 89/37.01; 89/41.01; 89/41.05; 235/400; 235/404; 235/411; 235/412; 235/413; 235/414; 235/415; 235/416; 235/417; 235/418; 434/11; 434/19; 434/20; 434/21; 434/22; 434/23; 434/27

(58) Field of Classification Search
None
See application file for complete search history.

(56) References Cited

U.S. PATENT DOCUMENTS

| | | | | |
|---|---|---|---|---|
| 4,370,914 A | * | 2/1983 | Voles | 89/41.05 |
| 4,922,801 A | * | 5/1990 | Jaquard et al. | 89/41.05 |
| 5,764,786 A | * | 6/1998 | Kuwashima et al. | 382/107 |
| 5,966,859 A | * | 10/1999 | Samuels | 42/70.11 |
| 5,991,043 A | * | 11/1999 | Andersson et al. | 356/400 |
| 6,174,288 B1 | * | 1/2001 | Samuels | 600/500 |
| 6,237,462 B1 | * | 5/2001 | Hawkes et al. | 89/41.05 |
| 6,871,439 B1 | * | 3/2005 | Edwards | 42/84 |
| 6,986,302 B2 | * | 1/2006 | LaFata | 89/1.11 |
| 6,997,716 B2 | * | 2/2006 | Skala et al. | 434/21 |
| 7,404,268 B1 | * | 7/2008 | Page | 42/137 |
| 8,051,597 B1 | * | 11/2011 | D'Souza et al. | 42/119 |
| 8,094,934 B2 | * | 1/2012 | Morimitsu | 382/168 |

(Continued)

FOREIGN PATENT DOCUMENTS

| | | |
|---|---|---|
| DE | 4408864 C1 | 9/1995 |
| JP | 10141913 A | 5/1998 |

OTHER PUBLICATIONS

"United Kingdom Application Serial No. 1122152.0, Combined Search and Examination Report mailed Apr. 23, 2012", 5 pgs.

*Primary Examiner* — Matthew Bella
*Assistant Examiner* — Jason Heidemann
(74) *Attorney, Agent, or Firm* — Schwegman, Lundberg & Woessner, P.A

(57) ABSTRACT

A system and method calculate a range and velocity of an object in image data. The range calculation includes detecting a contour of the object from the image data, forming a template from the image data based on the contour; and calculating a range to the object using pixel resolution and dimension statistics of the object. A three-dimensional velocity of the object is determined by calculating a radial component and an angular component of the velocity. The radial velocity component is calculated by determining the range of the object in two or more image frames, determining a time differential between the two or more image frames, and calculating the radial velocity as a function of the range of the object in the two or more image frames and the time differential between the two or more image frames. The angular component is calculated using spatial-temporal derivatives as a function of a motion constraint equation.

20 Claims, 5 Drawing Sheets

(56) References Cited

U.S. PATENT DOCUMENTS

| | | | | |
|---|---|---|---|---|
| 8,325,065 B2* | 12/2012 | Maris | | 340/995.28 |
| 8,336,776 B2* | 12/2012 | Horvath et al. | | 235/407 |
| 2004/0101162 A1* | 5/2004 | Higaki et al. | | 382/103 |
| 2006/0005447 A1* | 1/2006 | Lenner et al. | | 42/111 |
| 2007/0274566 A1* | 11/2007 | Fujimoto | | 382/103 |
| 2008/0273750 A1* | 11/2008 | Fujimoto | | 382/103 |
| 2009/0213219 A1* | 8/2009 | Eggert et al. | | 348/148 |
| 2013/0028486 A1* | 1/2013 | Backlund et al. | | 382/107 |

* cited by examiner

SYSTEM AND METHOD FOR RANGE AND VELOCITY ESTIMATION IN VIDEO DATA AS A FUNCTION OF ANTHROPOMETRIC MEASURES

TECHNICAL FIELD

The current disclosure relates to a system and method for estimating the range of an object in video data using anthropometric measures.

BACKGROUND

Many applications, such as applications that determine and execute target strikes, require range measurements from a sensor to a target of interest, velocity measurements of interest, and a view of the target. For example, the range to the target is used for estimation of bullet drop in a target strike, and the target velocity is used to predict the anticipated target location when the bullet strikes. Numerous optical flows in video data have been developed, and velocities are often computed in the image plane and therefore capture only two dimensions of the velocity vector. Moreover, such range and velocity computations are very demanding and not suitable for portable devices wherein computation resources are scarce. Consequently, for a portable device, it can be critical that the complexity of the designed algorithms draw only minimal power.

DETAILED DESCRIPTION

Figure 1:
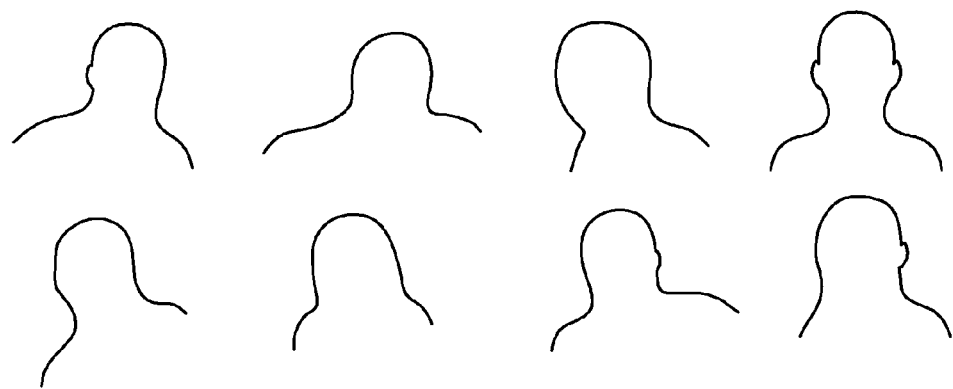
FIG. 1 illustrates several examples of head-and-shoulder models that can be used in connection an embodiment of the present disclosure.

Managing visual acuity and cognitive load when using firearms such as during combat operations are important to safely accomplishing mission objectives. While expert shooters have the ability to shift from visual attention to a somatosensory one during shooting, this ability is rarely encountered in a typical soldier. Developing technology that alleviates the need for visual attention by providing information extracted from the visual cues captured by a sensor will help every soldier be a marksman. The advanced video analytics methodology of the present disclosure facilitates and automates the interpretation of visual cues and enhances a soldier's or other rifleman's marksmanship.

Shooting a moving target is difficult since the target center is constantly shifting. Usually, a marksman cognitively estimates the target range and target velocity, then fires at the anticipated target location based on the estimated travel distance. In an embodiment, video analytics, rather than a marksman's cognitive estimations, are used to estimate target range and velocity, and to predict the expected target location. After the estimation process, the result can be displayed to the marksman, for example on a firearm scope, and this result including the position at which to aim enables a soldier to acquire and engage moving targets in the battlefield.

A firearm scope system can include a suite of sensors and an onboard processor, and as explained above, these features can augment the capabilities of a soldier or other marksman. These capabilities normally include visual information which is the primary cue sought by a soldier when using a scope. Enhancing the ability of a soldier in estimating the range to a target and the target velocity, and in compensating for bullet drop, will significantly improve the soldier's marksmanship, and therefore increase the safety of the soldier in the battlefield. Such advanced video analytics will improve the marksmanship of every soldier by reducing cognitive load on the solider and improving the assessment of ambient conditions. The video analytics of the current disclosure provides useful information to aid a soldier in striking the targets under situations ranging from close quarters combat (CQB) to long range targeting.

Numerous optic flow approaches have been developed to compute object velocity. However, these velocities are often computed in the image plane, and therefore capture only two dimensions of the velocity vector. Moreover, such computations are very intensive, and therefore are not suitable for a firearm application where computation resources are scarce. To address this issue, in an embodiment, the knowledge of the target range is leveraged, and an algorithm separately computes the angular (i.e., image plane velocity) and the radial components of the target velocity.

In an embodiment, the range to a target is estimated based on an anthropometric measurement such as a shape-based measure of virtually any object (such as the outline of a person's head and shoulders, or the outline of a car or tank). After determining the range, then a velocity estimate separately computes the radial and angular velocities.

For a target ranging aspect of an embodiment, anthropometric a priori knowledge is used. The knowledge of range to target can be important for precision target strikes. Many marksman requirements, such as bullet drop compensation, wind compensation, and moving target location prediction, depend primarily on the range to the target. It is known that expert shooters visually analyze anthropometric measurements such as the distance of the top of head to shoulders and shoulder to shoulder distance to estimate the target range. In an embodiment, a video analytics algorithm automates this ranging method, which reduces a soldier's cognitive load.

A three step process is used in computing the range to target. The first step automatically detects and extracts the anthropometric structure from the image. Many computer vision studies have shown that the head-and-shoulder contour has a consistent omega shape. Once the omega shape model is accurately fitted to the image, anthropometric measurements can be estimated directly from the template. The last step computes the range to the target using the extracted head-and-shoulder contour and length, pixel resolution, and a priori head-and-shoulder length derived from anthropometric statistics.

Computation of the target velocity is broken down into separate computations of its radial and angular components. The radial velocity leverages on the target range and the angular velocity (i.e., image plane velocity), and uses an approach requiring fewer computations than an optic flow approach. The radial velocity is computed based on the changes in object range between two frames and the time difference between the two frames. The range is estimated as described above. Angular velocity is computed using spatial-temporal derivatives based on a motion constraint equation. While instantaneous measurements of the three-dimensional velocity of the target are naturally prone to errors in computing gradient and ranging estimates, one or more embodiments are augmented by implementing filtering methods that leverage the high frame rate of a sensor to increase velocity estimation accuracy by combining instantaneous measurements and accumulations over a sliding window. An embodiment is best implemented in low power hardware, such as field programmable gate arrays (FPGA) or digital signal processors (DSP), with interfaces including memory storage and input image frame acquisition such as a frame grabber.

Figure 2:
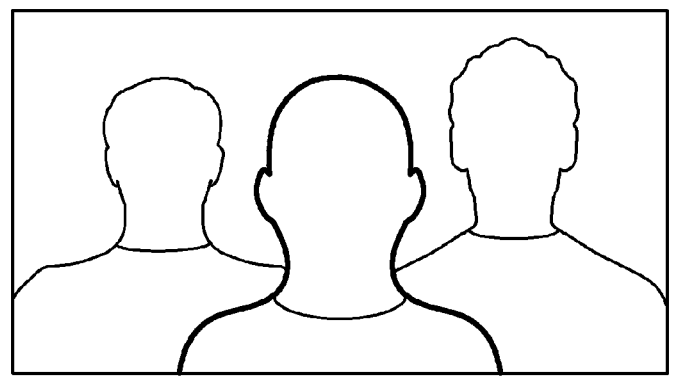
FIG. 2 illustrates an example of fitting a head-and-shoulder model to a frame of video data.

The first step in determining the range to the target consists of automatically detecting and extracting the anthropometric structure from the image. As noted above, numerous computer vision studies have shown that the often observed head-and-shoulder contour has a consistent omega ($\Omega$) shape, and algorithms have been developed to detect such contour. In one approach, a processor detects the edges of a head-and-shoulder contour in an image, and the edges are matched with a nominal set of head-and-shoulder models using a gradient descent approach. Examples of several such models are illustrated in FIG. 1. As an alternative to a gradient descent approach, a distance transformation could be computed on the edges, and matched with the head-and-shoulder model, as illustrated in FIG. 2. Since the head-and-shoulder contour is pose and range dependent, several models (as illustrated in FIG. 1) may be needed. In an embodiment, one of the shape-based head-and-shoulder detection approaches is adopted such that the computational load is minimized. For example, a smaller set of head-and-shoulder models could be used, and the search area could be limited by exploiting the fact that the intended target is located at the center of the displayed image.

Figure 3:
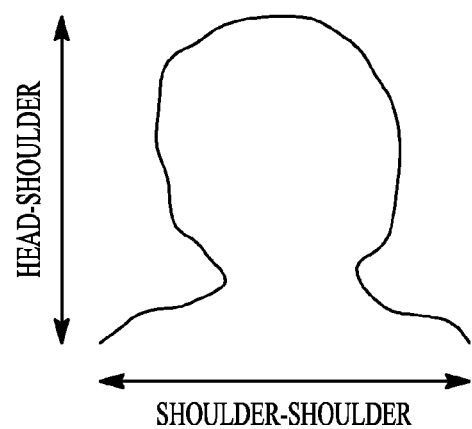
FIG. 3 illustrates a head-to-shoulder and a shoulder-to-shoulder measurement.
Figure 4:
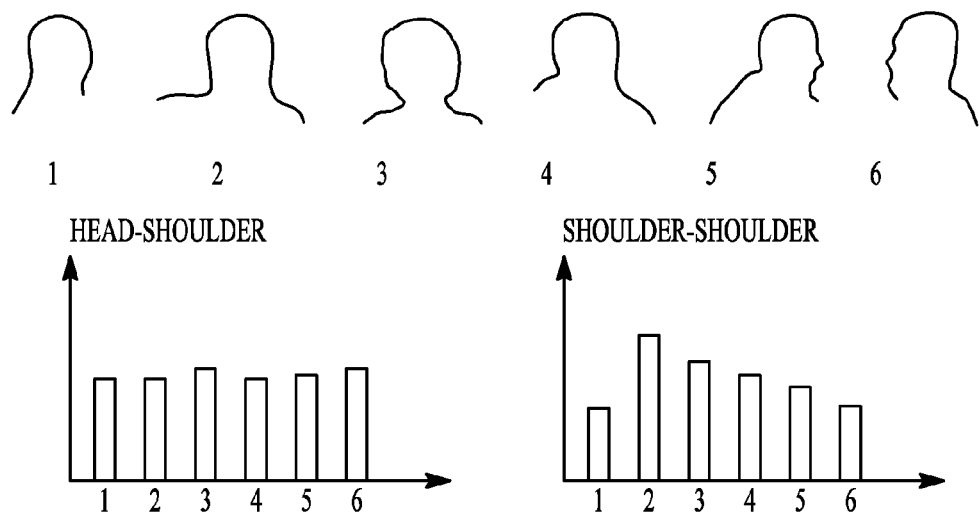
FIG. 4 illustrates an invariance of a head-to-shoulder measurement and a variance of a shoulder-to-shoulder measurement.

Once the $\Omega$-shape model is accurately fitted to the image, anthropometric measurements can be estimated directly from the template. In an embodiment, attention is focused primarily on the distance from the top of the head to the shoulder. See FIG. 3. It is noted that shoulder-to-shoulder width could be used, but shoulder-to-shoulder width varies as the pose of a person changes, thereby requiring pose estimation techniques for an accurate range estimation. FIG. 4 illustrates head-to-shoulder outlines of various poses (profile, head on, and positions in between), and that the head-to-shoulder measurement remains consistent throughout the poses while the shoulder-to-shoulder measurement varies.

The last step computes the range to the target, R, from the extracted head-to-shoulder length ($L_{HS}$ in pixels), pixel resolution ($P_\Theta$ in pixels per radian, which depends on the scope magnification), and the a priori head-to-shoulder length, $L_A$, derived from anthropometric statistics.

$$R = L_A/\theta = L_A/L_{HS} \cdot P_\Theta$$

Figure 5:
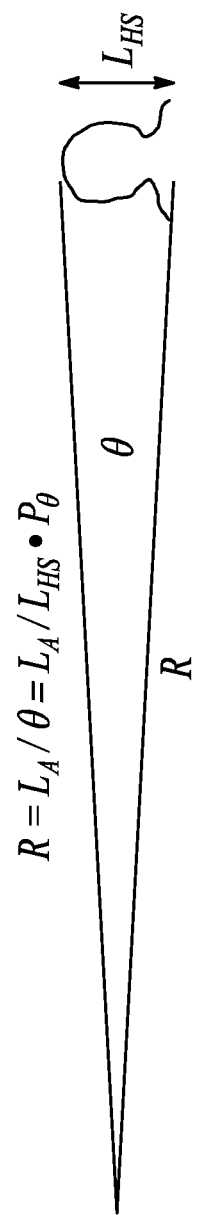
FIG. 5 illustrates a calculation of a range to a target.

The range calculation is illustrated in FIG. 5.

The head-to-shoulder length of each person differs slightly and the head-to-shoulder distance in pixels may not be precise, thus resulting in an error in range computation. However, an error of 10 m at 600 m distance is tolerable and will not negatively impact a soldier or other marksman. An error in range estimates can be quantified and a variance can be provided on the estimated range that reflects the accuracy of the $\Omega$-shape model fitting. Results can always be analyzed to ensure that the range accuracy is within the tolerance.

The normal flow, which corresponds to the motion along the normal to edges of the head-to-shoulder contour, represents a good estimation of the lateral or angular target velocity, $v_n$. The normal flow is computed from the spatial-temporal derivatives of the target structure as follows:

$$v_n = \frac{-I_t(I_x, I_y)}{\|\nabla I\|^2}$$

where $I_t$, $I_x$, $I_y$, are the temporal derivative and the intensity derivatives along the x and y directions respectively. $\nabla I$ is the spatial intensity gradient.

The radial velocity of the object is computed based on the changes in the range to the target, which is equivalent to changes in sizes of the object in the images. By registering the ranges of the object at time $\tau$ and $\tau-\delta\tau$, the radial velocity is readily computed by the following formula:

$$v_r = (R_{\tau-\delta\tau} - R_\tau)/\delta\tau$$

These instantaneous measurements of the three dimensional velocity of the target are naturally prone to errors in computing gradient and ranging estimates. However, the method is augmented by implementing filtering techniques that leverage the high frame rate of the sensor to increase velocity estimation accuracy by combining instantaneous measurements and accumulations over a sliding window.

The calculated target range and target velocity can be used to compensate for moving targets. In order to strike a moving target, a rifleman predicts the location where the target is anticipated to move to before shooting. Using the algorithm, once the angular and radial target velocities are computed, the anticipated target location ($x_{\tau+\delta\tau}$, $y_{\tau+\delta\tau}$) is estimated from the current target location ($x_\tau$, $y_\tau$), the target velocity ($v_n$, $v_r$), and the flight time of the bullet, which is computed from the known bullet exit velocity, $v_0$, and the range to target, R, as determined above. After these computations and estimations, the target location of a moving subject is accurately predicted and displayed on a scope. While this is a very challenging task as many factors have to be taken into account such as wind, ambient air density, drag coefficient, and elevation of the shot for an accurate estimation, a large number of resources are available to model bullet trajectory and therefore infer the time of flight. In combination with these additional resources, the physical parameters of range and velocity are derived from the currently disclosed video analytics system and method, variations are assessed, and efficient approximations are made that assist the soldier in engaging and shooting moving targets.

Figure 6:
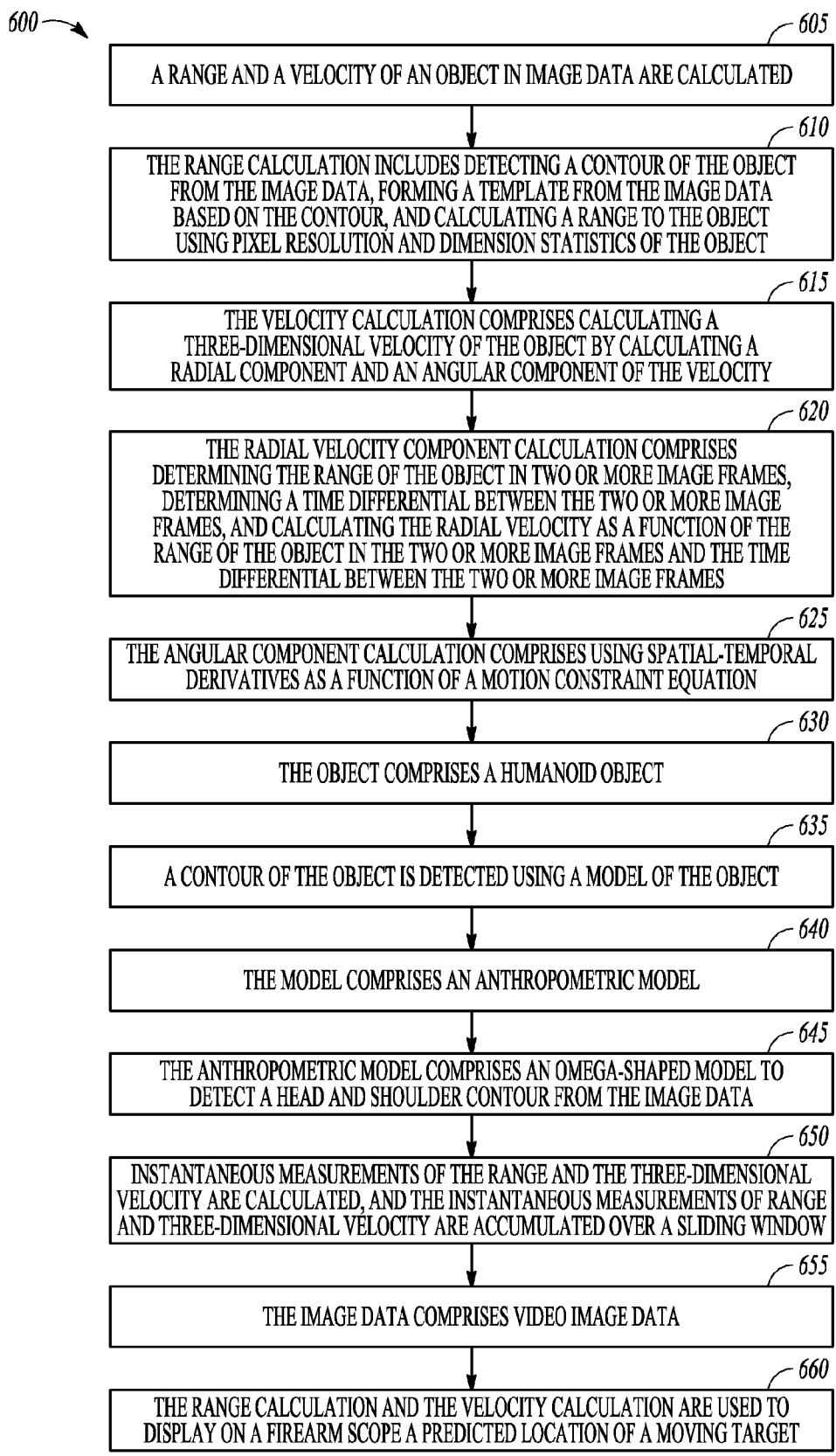
FIG. 6 is a hierarchy of an example embodiment of a process to determine a range estimation in video data.

FIG. 6 is a hierarchy of an example process 600 for estimating a range in video data as a function of anthropometric measures. FIG. 6 includes a number of process blocks 605-660. Though arranged serially in the example of FIG. 6, other examples may reorder the blocks, omit one or more blocks, and/or execute two or more blocks in parallel using multiple processors or a single processor organized as two or more virtual machines or sub-processors. Moreover, still other examples can implement the blocks as one or more specific interconnected hardware or integrated circuit modules with related control and data signals communicated between and through the modules. Thus, any process flow is applicable to software, firmware, hardware, and hybrid implementations.

Referring now to FIG. 6, at 605, a range and a velocity of an object in image data are calculated. At 610, the range calculation includes detecting a contour of the object from the image data, forming a template from the image data based on the contour, and calculating a range to the object using pixel resolution and dimension statistics of the object. At 615, the velocity calculation comprises calculating a three-dimensional velocity of the object by calculating a radial component and an angular component of the velocity. At 620, the radial velocity component calculation comprises determining the range of the object in two or more image frames, determining a time differential between the two or more image frames, and calculating the radial velocity as a function of the range of the object in the two or more image frames and the time differential between the two or more image frames. At 625, the angular component calculation comprises using spatial-temporal derivatives as a function of a motion constraint equation.

At 630, the object comprises a humanoid object. At 635, a contour of the object is detected using a model of the object. At 640, the model comprises an anthropometric model. At 645, the anthropometric model comprises an omega-shaped model to detect a head and shoulder contour from the image data. At 650, instantaneous measurements of the range and the three-dimensional velocity are calculated, and the instantaneous measurements of range and three-dimensional velocity are accumulated over a sliding window. At 655, the image data comprises video image data. At 660, the range calculation and the velocity calculation are used to display on a firearm scope a predicted location of a moving target.

Figure 7:
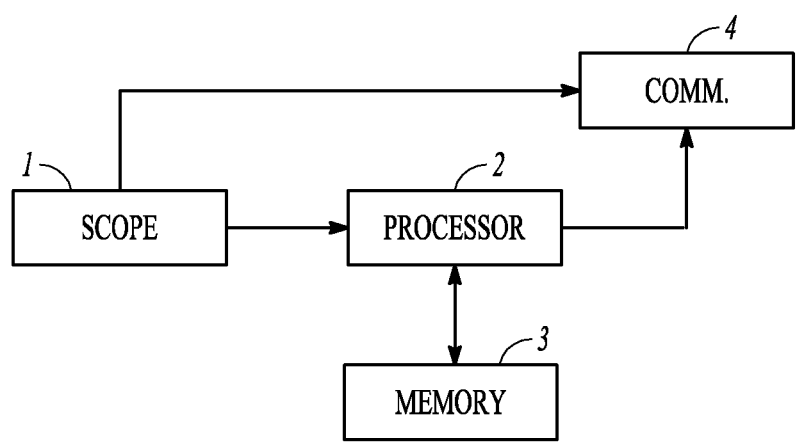
FIG. 7 is a block diagram of a computer processor system in connection with which one or more embodiments of the present disclosure can operate.

FIG. 7 is an overview diagram of a hardware and operating environment in conjunction with which embodiments of the invention may be practiced. The description of FIG. 7 is intended to provide a brief, general description of suitable computer hardware and a suitable computing environment in conjunction with which the invention may be implemented. In some embodiments, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computer environments where tasks are performed by I/0 remote processing devices that are linked through a communications network. In a distributed computing environment, program modules may be located in both local and remote memory storage devices.

In the embodiment shown in FIG. 7, an image device 1, such as a camera or a scope, is connected via a data input/output with a first data input/output of a processor 2, which can be a computer processor, a digital signal processor, a FPGA or ASIC. The processor computes the range and velocity of the target in the image streamed in through the imaging device. Processor 2 is connected via its second input/output to a memory device 3, which serves as the storage for the intermediate results and for the execution commands and parameters for the range and velocity estimation. Outputs of the processor are sent to the communication device 4, which also receives the outputs of the imaging device 1. The communication device, which may include a transceiver, and a display unit, such as a LCD, integrates and overlays the range and velocity estimates onto the images.

It should be understood that there exist implementations of other variations and modifications of the invention and its various aspects, as may be readily apparent, for example, to those of ordinary skill in the art, and that the invention is not limited by specific embodiments described herein. Features and embodiments described above may be combined with each other in different combinations. It is therefore contemplated to cover any and all modifications, variations, combinations or equivalents that fall within the scope of the present invention.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

The invention claimed is:

1. A process comprising:
    calculating a range and a velocity of an object in image data;
    wherein the range calculation comprises:
        detecting a contour of the object from the image data;
        forming a template from the image data based on the contour; and
        calculating a range to the object using pixel resolution and dimension statistics of the object;
    wherein the velocity calculation comprises calculating a three-dimensional velocity of the object by calculating a radial component and an angular component of the velocity;
    wherein the radial velocity component calculation comprises:
        determining the range of the object in two or more image frames;
        determining a time differential between the two or more image frames; and
        calculating the radial velocity as a function of the range of the object in the two or more image frames and the time differential between the two or more image frames; and
    wherein the angular component calculation comprises using spatial-temporal derivatives as a function of a motion constraint equation.

2. The process of claim 1, wherein the object comprises a humanoid object.

3. The process of claim 1, comprising detecting a contour of the object using a model of the object.

4. The process of claim 3, wherein the model comprises an anthropometric model.

5. The process of claim 4, wherein the anthropometric model comprises an omega-shaped model to detect a head and shoulder contour from the image data.

6. The process of claim 1, comprising:
    calculating instantaneous measurements of the range and the three-dimensional velocity; and
    accumulating the instantaneous measurements of range and three-dimensional velocity over a sliding window.

7. The process of claim 1, wherein the image data comprises video image data.

8. The process of claim 1, comprising using the range calculation and the velocity calculation to display on a firearm scope a predicted location of a moving target.

9. A system comprising:
    a video sensing device; and
    a computer processor coupled to the video sensing device, wherein the computer processor is configured for:
        calculating a range and a velocity of an object in image data;
        wherein the range calculation comprises:
            detecting a contour of the object from the image data;
            forming a template from the image data based on the contour; and calculating a range to the object using pixel resolution and dimension statistics of the object;
wherein the velocity calculation comprises calculating a three-dimensional velocity of the object by calculating a radial component and an angular component of the velocity;
wherein the radial velocity component calculation comprises:
   determining the range of the object in two or more image frames;
   determining a time differential between the two or more image frames; and
   calculating the radial velocity as a function of the range of the object in the two or more image frames and the time differential between the two or more image frames; and
wherein the angular component calculation comprises using spatial-temporal derivatives as a function of a motion constraint equation.

10. The system of claim 9, wherein the object comprises a humanoid object.

11. The system of claim 9, comprising a computer processor configured for detecting a contour of the object using a model of the object.

12. The system of claim 11, wherein the model comprises an anthropometric model.

13. The system of claim 12, wherein the anthropometric model comprises an omega-shaped model to detect a head and shoulder contour from the image data.

14. The system of claim 9, comprising a computer processor configured for:
   calculating instantaneous measurements of the range and the three-dimensional velocity; and
   accumulating the instantaneous measurements of range and three-dimensional velocity over a sliding window.

15. The system of claim 9, wherein the image data comprises video image data.

16. The system of claim 9, comprising a computer processor configured for using the range calculation and the velocity calculation to display on a firearm scope a predicted location of a moving target.

17. A non-transitory computer readable medium comprising instructions that when executed by a computer processor execute a process comprising:
   calculating a range and a velocity of an object in image data;
   wherein the range calculation comprises:
      detecting a contour of the object from the image data;
      forming a template from the image data based on the contour; and
      calculating a range to the object using pixel resolution and dimension statistics of the object;
   wherein the velocity calculation comprises calculating a three-dimensional velocity of the object by calculating a radial component and an angular component of the velocity;
      wherein the radial velocity component calculation comprises:
         determining the range of the object in two or more image frames;
         determining a time differential between the two or more image frames; and
         calculating the radial velocity as a function of the range of the object in the two or more image frames and the time differential between the two or more image frames; and
      wherein the angular component calculation comprises using spatial-temporal derivatives as a function of a motion constraint equation.

18. The computer readable medium of claim 17, comprising instructions for detecting a contour of the object using a model of the object; wherein the model comprises an anthropometric model; and wherein the anthropometric model comprises an omega-shaped model to detect a head and shoulder contour from the image data.

19. The computer readable medium of claim 17, comprising instructions for:
   calculating instantaneous measurements of the range and the three-dimensional velocity; and
   accumulating the instantaneous measurements of range and three-dimensional velocity over a sliding window.

20. The computer readable medium of claim 17, comprising instructions for using the range calculation and the velocity calculation to display on a firearm scope a predicted location of a moving target.

* * * * *